United States Patent
Misaizu et al.

(10) Patent No.: US 8,724,174 B2
(45) Date of Patent: May 13, 2014

(54) IMAGE PROCESSING APPARATUS, IMAGE FORMING APPARATUS, IMAGE PROCESSING METHOD, AND COMPUTER-READABLE MEDIUM

(75) Inventors: Toru Misaizu, Kanagawa (JP); Kenji Hara, Kanagawa (JP); Shigeru Arai, Kanagawa (JP); Koichi Matsubara, Kanagawa (JP); Kouta Matsuo, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 93 days.

(21) Appl. No.: 13/361,474

(22) Filed: Jan. 30, 2012

(65) Prior Publication Data

US 2013/0021624 A1    Jan. 24, 2013

(30) Foreign Application Priority Data

Jul. 22, 2011  (JP) ................................. 2011-161140
Nov. 1, 2011   (JP) ................................. 2011-240166

(51) Int. Cl.
| G06K 1/00 | (2006.01) |
| G06F 15/00 | (2006.01) |
| H04N 1/46 | (2006.01) |

(52) U.S. Cl.
USPC ............. 358/3.15; 358/1.1; 358/500; 358/1.9

(58) Field of Classification Search
USPC .................................. 358/1.1–1.9, 1.11–1.18
See application file for complete search history.

(56) References Cited

U.S. PATENT DOCUMENTS

| 2003/0194147 A1* | 10/2003 | Yamazaki ..................... 382/266 |
| 2007/0279695 A1 | 12/2007 | Kouzaki et al. |
| 2008/0123141 A1* | 5/2008 | Noguchi ........................ 358/2.1 |

FOREIGN PATENT DOCUMENTS

| JP | 2006-262204 A | 9/2006 |
| JP | 2007-323024 A | 12/2007 |

* cited by examiner

*Primary Examiner* — King Poon
*Assistant Examiner* — Ibrahim Siddo
(74) *Attorney, Agent, or Firm* — Sughrue Mion, PLLC

(57) ABSTRACT

An image processing apparatus includes an edge-portion detector, an edge-width detector, and a tone correction unit. The edge-portion detector detects a pixel of an edge portion by determining whether or not each of pixels constituting image data which has been input is a pixel which is included in the edge portion. The edge-width detector detects, for the pixel of the edge portion detected by the edge-portion detector, an edge width which is a width of the edge portion. When the edge width detected by the edge-width detector is smaller than a value which is set in advance, the tone correction unit performs tone correction differently in accordance with the detected edge width.

8 Claims, 11 Drawing Sheets

FIG. 7

| P1 | P2 | P3 |
|----|----|----|
| P4 | P5 | P6 |
| P7 | P8 | P9 |

FIG. 8

| COLUMN | 1 | 2 | 3 | 4 | 5 | 6 | 7 | 8 | 9 |
|---|---|---|---|---|---|---|---|---|---|
| ROW | | | | | | | | | |
| 1 | 1 | 2 | 3 | 4 | 5 | 6 | 7 | 8 | 9 |
| 2 | 10 | 11 | 12 | 13 | 14 | 15 | 16 | 17 | 18 |
| 3 | 19 | 20 | 21 | 22 | 23 | 24 | 25 | 26 | 27 |
| 4 | 28 | 29 | 30 | 31 | 32 | 33 | 34 | 35 | 36 |
| 5 | 37 | 38 | 39 | 40 | 41 | 42 | 43 | 44 | 45 |
| 6 | 46 | 47 | 48 | 49 | 50 | 51 | 52 | 53 | 54 |
| 7 | 55 | 56 | 57 | 58 | 59 | 60 | 61 | 62 | 63 |
| 8 | 64 | 65 | 66 | 67 | 68 | 69 | 70 | 71 | 72 |
| 9 | 73 | 74 | 75 | 76 | 77 | 78 | 79 | 80 | 81 |

FIG. 9A

| | DOT DETERMINATION | BACKGROUND DETERMINATION | BACKGROUND DENSITY DETERMINATION | DOT DENSITY DETERMINATION |
|---|---|---|---|---|
| HORIZONTAL DETECTION | — | 40 = 42 | 40 ≤ BACKGROUND DENSITY THRESHOLD | 41−40 ≤ DOT DENSITY THRESHOLD |
| VERTICAL DETECTION | — | 32 = 50 | 32 ≤ BACKGROUND DENSITY THRESHOLD | 41−32 ≤ DOT DENSITY THRESHOLD |

FIG. 9B

| | DOT DETERMINATION | BACKGROUND DETERMINATION | BACKGROUND DENSITY DETERMINATION | DOT DENSITY DETERMINATION |
|---|---|---|---|---|
| HORIZONTAL DETECTION 1 | 41 = 40 | 39 = 42 | 39 ≤ BACKGROUND DENSITY THRESHOLD | 41−39 ≤ DOT DENSITY THRESHOLD |
| HORIZONTAL DETECTION 2 | 41 = 42 | 40 = 43 | 40 ≤ BACKGROUND DENSITY THRESHOLD | 41−40 ≤ DOT DENSITY THRESHOLD |
| VERTICAL DETECTION 1 | 41 = 32 | 23 = 50 | 23 ≤ BACKGROUND DENSITY THRESHOLD | 41−23 ≤ DOT DENSITY THRESHOLD |
| VERTICAL DETECTION 2 | 41 = 50 | 32 = 59 | 32 ≤ BACKGROUND DENSITY THRESHOLD | 41−32 ≤ DOT DENSITY THRESHOLD |

FIG. 9C

| | DOT DETERMINATION | BACKGROUND DETERMINATION | BACKGROUND DENSITY DETERMINATION | DOT DENSITY DETERMINATION |
|---|---|---|---|---|
| HORIZONTAL DETECTION 1 | 41 = 39 = 40 | 38 = 42 | 38 ≤ BACKGROUND DENSITY THRESHOLD | 41−38 ≤ DOT DENSITY THRESHOLD |
| HORIZONTAL DETECTION 2 | 41 = 40 = 42 | 39 = 43 | 39 ≤ BACKGROUND DENSITY THRESHOLD | 41−39 ≤ DOT DENSITY THRESHOLD |
| HORIZONTAL DETECTION 3 | 41 = 42 = 43 | 40 = 44 | 40 ≤ BACKGROUND DENSITY THRESHOLD | 41−40 ≤ DOT DENSITY THRESHOLD |
| VERTICAL DETECTION 1 | 41 = 23 = 32 | 14 = 50 | 14 ≤ BACKGROUND DENSITY THRESHOLD | 41−14 ≤ DOT DENSITY THRESHOLD |
| VERTICAL DETECTION 2 | 41 = 32 = 50 | 23 = 59 | 23 ≤ BACKGROUND DENSITY THRESHOLD | 41−23 ≤ DOT DENSITY THRESHOLD |
| VERTICAL DETECTION 3 | 41 = 50 = 59 | 32 = 68 | 32 ≤ BACKGROUND DENSITY THRESHOLD | 41−32 ≤ DOT DENSITY THRESHOLD |

FIG. 10

| | DOT DETERMINATION | BACKGROUND DETERMINATION | BACKGROUND DENSITY DETERMINATION | DOT DENSITY DETERMINATION |
|---|---|---|---|---|
| HORIZONTAL DETECTION 1 | 41 = 38 = 39 = 40 | 37 = 42 | 37 ≤ BACKGROUND DENSITY THRESHOLD | 41−37 ≤ DOT DENSITY THRESHOLD |
| HORIZONTAL DETECTION 2 | 41 = 39 = 40 = 42 | 38 = 43 | 38 ≤ BACKGROUND DENSITY THRESHOLD | 41−38 ≤ DOT DENSITY THRESHOLD |
| HORIZONTAL DETECTION 3 | 41 = 40 = 42 = 43 | 39 = 44 | 39 ≤ BACKGROUND DENSITY THRESHOLD | 41−39 ≤ DOT DENSITY THRESHOLD |
| HORIZONTAL DETECTION 4 | 41 = 42 = 43 = 44 | 40 = 45 | 40 ≤ BACKGROUND DENSITY THRESHOLD | 41−40 ≤ DOT DENSITY THRESHOLD |
| VERTICAL DETECTION 1 | 41 = 14 = 23 = 32 | 5 = 50 | 5 ≤ BACKGROUND DENSITY THRESHOLD | 41−5 ≤ DOT DENSITY THRESHOLD |
| VERTICAL DETECTION 2 | 41 = 23 = 32 = 50 | 14 = 59 | 14 ≤ BACKGROUND DENSITY THRESHOLD | 41−14 ≤ DOT DENSITY THRESHOLD |
| VERTICAL DETECTION 3 | 41 = 32 = 50 = 59 | 23 = 68 | 23 ≤ BACKGROUND DENSITY THRESHOLD | 41−23 ≤ DOT DENSITY THRESHOLD |
| VERTICAL DETECTION 4 | 41 = 50 = 59 = 68 | 32 = 77 | 32 ≤ BACKGROUND DENSITY THRESHOLD | 41−32 ≤ DOT DENSITY THRESHOLD |

FIG. 11

| RESULT OF EDGE-PORTION DETECTION PROCESS | RESULT OF EDGE-WIDTH DETECTION PROCESS | EDGE TONE CORRECTION | SCREEN RULING |
|---|---|---|---|
| NON-EDGE PORTION | — | — | 200 LINES |
| EDGE PORTION | WIDTH OF ONE DOT | LUT1 | 600 LINES |
| EDGE PORTION | WIDTH OF TWO DOTS | LUT2 | 600 LINES |
| EDGE PORTION | WIDTH OF THREE DOTS | LUT3 | 600 LINES |
| EDGE PORTION | WIDTH OF FOUR DOTS | LUT4 | 600 LINES |
| EDGE PORTION | WIDTH OF FIVE DOTS OR MORE | — | 200 LINES |

IMAGE PROCESSING APPARATUS, IMAGE FORMING APPARATUS, IMAGE PROCESSING METHOD, AND COMPUTER-READABLE MEDIUM

CROSS-REFERENCE TO RELATED APPLICATIONS

This application is based on and claims priority under 35 USC 119 from Japanese Patent Application No. 2011-161140 filed Jul. 22, 2011 and Japanese Patent Application No. 2011-240166 filed Nov. 1, 2011.

BACKGROUND

(i) Technical Field

The present invention relates to an image processing apparatus, an image forming apparatus, an image processing method, and a computer-readable medium.

SUMMARY

According to an aspect of the invention, there is provided an image processing apparatus including an edge-portion detector, an edge-width detector, and a tone correction unit. The edge-portion detector detects a pixel of an edge portion by determining whether or not each of pixels constituting image data which has been input is a pixel which is included in the edge portion. The edge-width detector detects, for the pixel of the edge portion detected by the edge-portion detector, an edge width which is a width of the edge portion. When the edge width detected by the edge-width detector is smaller than a value which is set in advance, the tone correction unit performs tone correction differently in accordance with the detected edge width.

BRIEF DESCRIPTION OF THE DRAWINGS

Exemplary embodiment(s) of the present invention will be described in detail based on the following figures, wherein:

FIG. 7 is a diagram for explaining the details of an edge-portion detection process performed by an edge determination unit illustrated in FIG. 6;

FIG. 8 is a diagram illustrating a determination window of nine columns×nine rows that is used in an edge-width detection process performed by the edge determination unit illustrated in FIG. 6;

FIGS. 9A to 9C are tables of conditions for determining a one-dot positive fine line, a two-dot positive fine line, and a three-dot positive fine line, respectively;

FIG. 10 is a table of conditions for determining a four-dot positive fine line; and FIG. 11 is a diagram illustrating an example of settings for edge tone correction performed by an edge tone correction unit, and settings for screen processing performed by a screen processing unit.

DETAILED DESCRIPTION

Overview of Present Invention

First, in order to help to understand the present invention, the background and overview thereof will be described.

In a case of performing a printing process on the basis of multiple-value image data, screen processing (halftone processing) is performed in order to express halftones. In screen processing, it is necessary to set a screen ruling, which is a value expressing the arrangement density of dots.

Screen processing with a high screen ruling may be performed for characters, line drawings, or the like because an image without jaggies or the like is more pleasant to look at. For a region that has been subjected to certain halftone processing, screen processing with a low screen ruling may be performed so that the screen structure does not become noticeable.

For this reason, a technique is used, in which an edge portion is detected in image data, and in which the screen ruling in screen processing is switched in accordance with whether an edge portion or a non-edge portion is detected.

Figure 1:
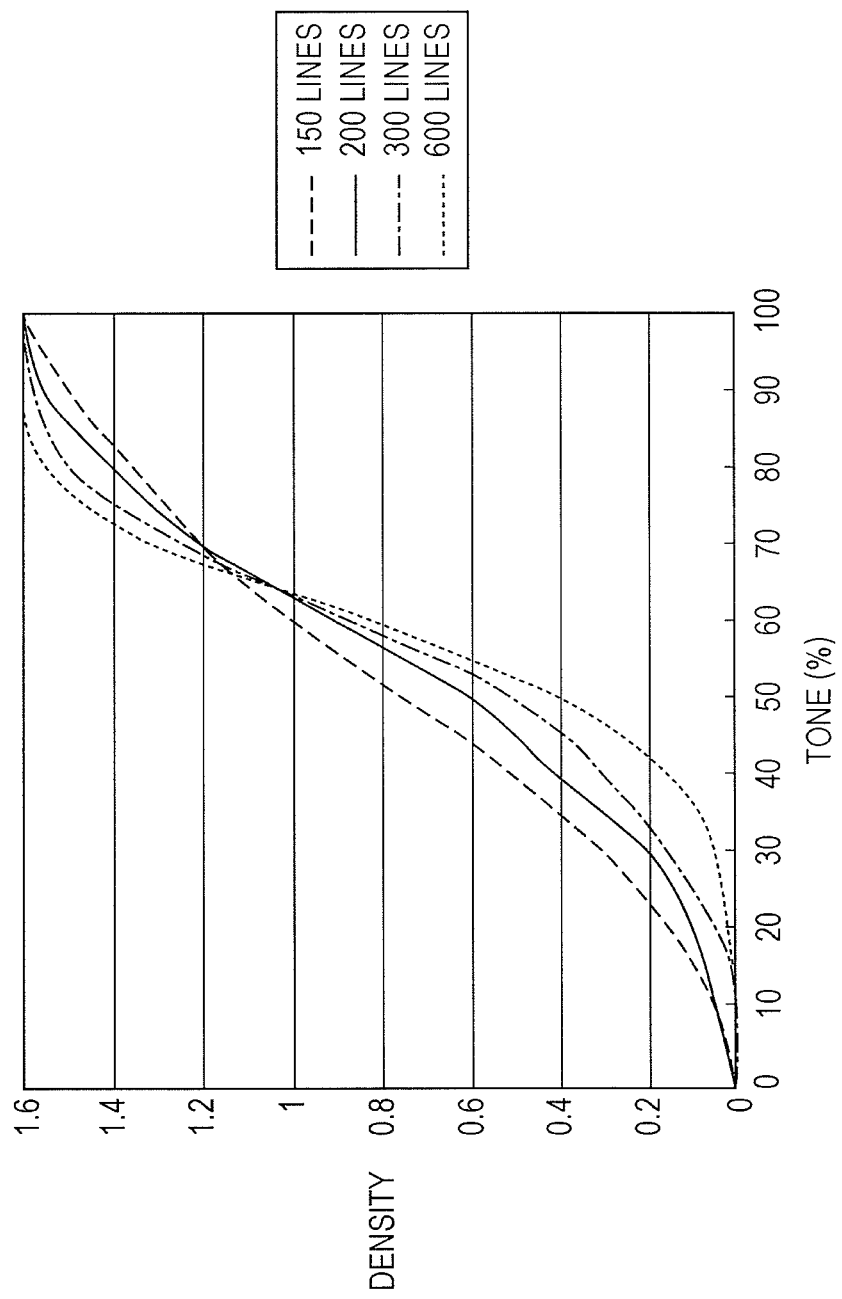
FIG. 1 is a diagram illustrating the relationships between screen rulings in screen processing and tone characteristics in a printed image.

However, as illustrated in FIG. 1, tone characteristics in a printed image differ in accordance with a screen ruling in screen processing. Referring to FIG. 1, in cases of screen rulings of 150 lines, 200 lines, 300 lines, and 600 lines, even when tone values are the same, density values are different in a printed image. Accordingly, a lookup table (LUT) that is to be used to perform tone correction is switched in accordance with whether an edge portion or a non-edge portion is detected in image data.

Figure 2:
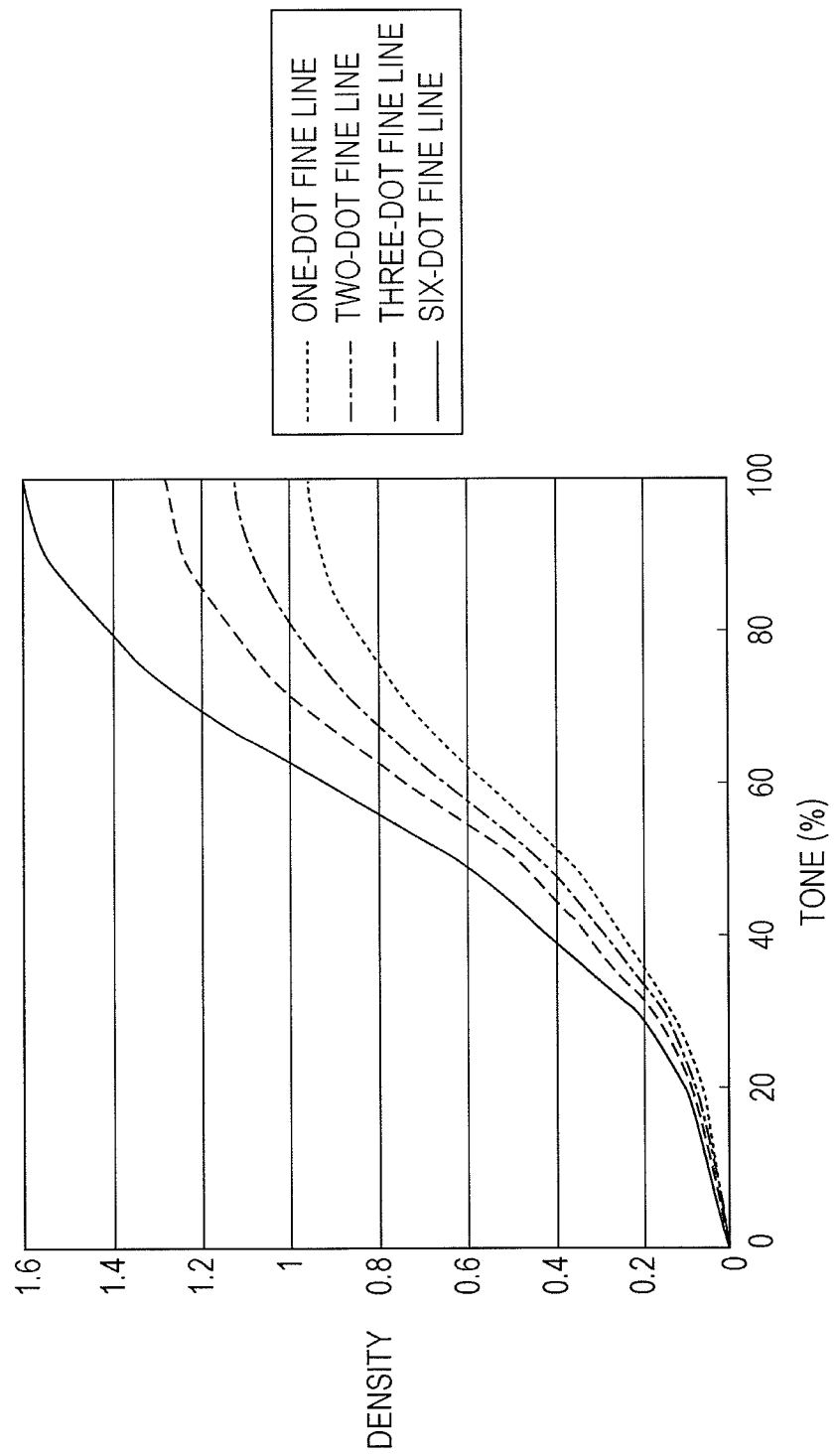
FIG. 2 is a diagram illustrating an example of tone characteristics in a case in which fine lines having different line widths are printed.

However, the inventors of the present application have noticed that, even regarding the same edge portion, tone characteristics differ in accordance with a line width (an edge width). For example, an example of tone characteristics in cases in which fine lines having different line widths are printed is illustrated in FIG. 2. As will be understood by referring to FIG. 2, even for the same tone value, a fine line having a smaller line width is printed with a lower density.

Accordingly, when a fine line having a small line width and a patch region in which pixels having the same pixel value are continuously provided over a large area are printed using the same tone characteristics, a negative influence occurs.

Figure 3A:
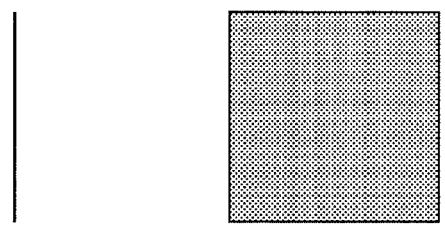
FIGS. 3A to 3C are diagrams for explaining cases in which an image including a fine line and a patch region is printed.
Figure 3B:
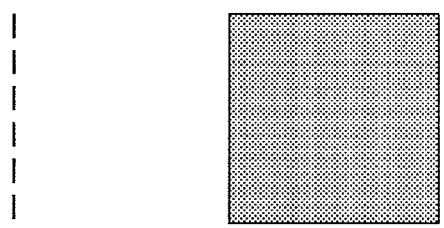
Figure 3C:
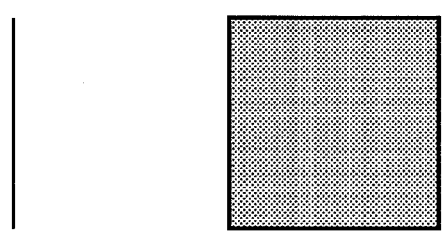

For example, a case of performing a printing process on the basis of image data illustrated in FIG. 3A will be described. In the image data illustrated in FIG. 3A, a fine line having a small line width, and a patch region in which pixels having the same tone value are continuously provided are included. When tone correction is performed using the tone characteristics of the patch region for the image data illustrated in FIG. 3A, the fine line becomes faint in a printed image illustrated in FIG. 3B in some cases. In contrast, when tone correction is performed using the tone characteristics of the fine line for the image data illustrated in FIG. 3A, the density of an edge portion of the patch region becomes higher than that of the other portion in a printed image illustrated in FIG. 3C although the fine line is printed with a desired density. Thus, the patch region becomes surrounded with a border.

For this reason, in the present invention, an edge width of an edge portion is detected, and tone correction is performed differently in accordance with the detected edge width.

Exemplary Embodiment

Next, an exemplary embodiment of the present invention will be described in detail with reference to the drawings.

Figure 4:
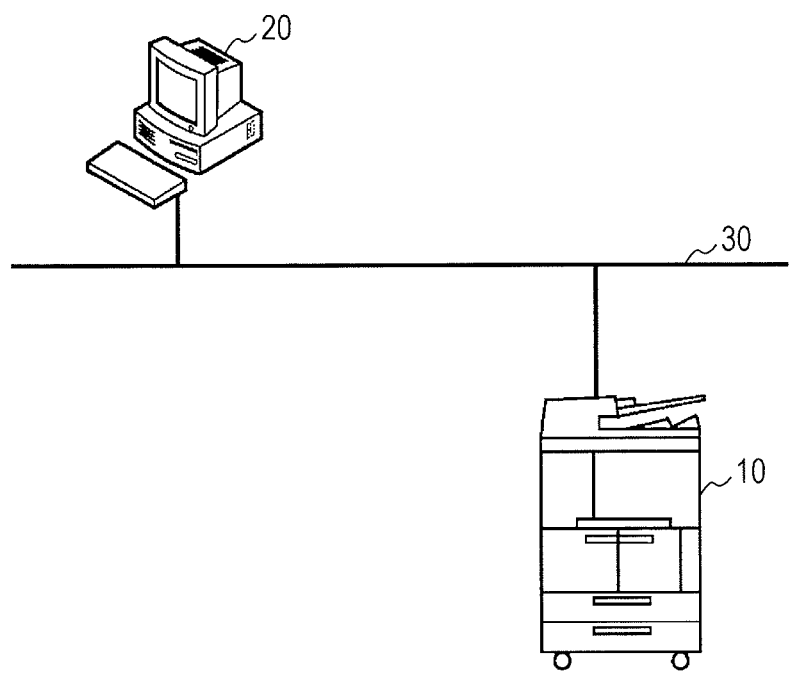
FIG. 4 is a diagram illustrating a configuration of an image forming system according to an exemplary embodiment of the present invention.

FIG. 4 is a block diagram illustrating a configuration of an image forming system according to the exemplary embodiment of the present invention.

As illustrated in FIG. 4, the image forming system according to the exemplary embodiment of the present invention includes an image forming apparatus 10 and a terminal apparatus 20 that are connected to each other using a network 30. The terminal apparatus 20 generates image data that is expressed in a page description language (PDL) or the like, and transmits the generated image data to the image forming apparatus 10 via the network 30. The image forming apparatus 10 receives the image data, which has been transmitted from the terminal apparatus 20, and outputs an image based on the image data onto a sheet of paper. Note that the image forming apparatus 10 is an apparatus that is so-called a multifunction machine having multiple functions such as a print function, a scan function, a copy function, and a facsimile function.

Figure 5:
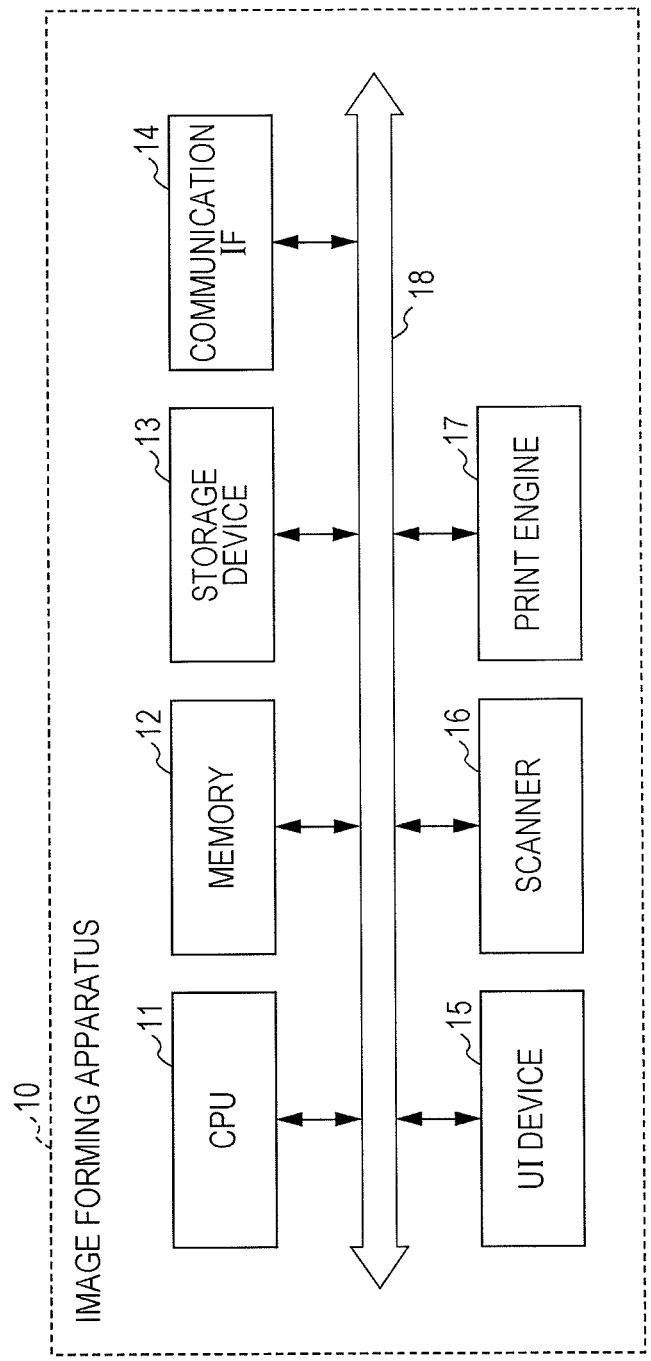
FIG. 5 is a block diagram illustrating a hardware configuration of an image forming apparatus according to the exemplary embodiment of the present invention.

Next, a hardware configuration of the image forming apparatus 10 in the image forming system according to the present exemplary embodiment is illustrated in FIG. 5.

As illustrated in FIG. 5, the image forming apparatus 10 includes a central processing unit (CPU) 11, a memory 12, a storage device 13 such as a hard disk drive (HDD), a communication interface (IF) 14, a user interface (UI) device 15, a scanner 16, and a print engine 17. The communication IF 14 performs transmission and reception of data to/from an external apparatus via the network 30. The UI device 15 includes a touch panel, or a liquid crystal display and a keyboard. The CPU 11, the memory 12, the storage device 13, the communication IF 14, the UI device 15, the scanner 16, and the print engine 17 are connected to each other via a control bus 18.

The CPU 11 performs a predetermined process on the basis of a control program that is stored in the memory 12 or the storage device 13, thereby controlling an operation of the image forming apparatus 10. Note that, although the CPU 11 reads and executes the control program stored in the memory 12 or the storage device 13 in the present exemplary embodiment as described above, the control program may be stored in a storage medium such as a compact disc read-only memory (CD-ROM), and may be provided for the CPU 11.

Figure 6:
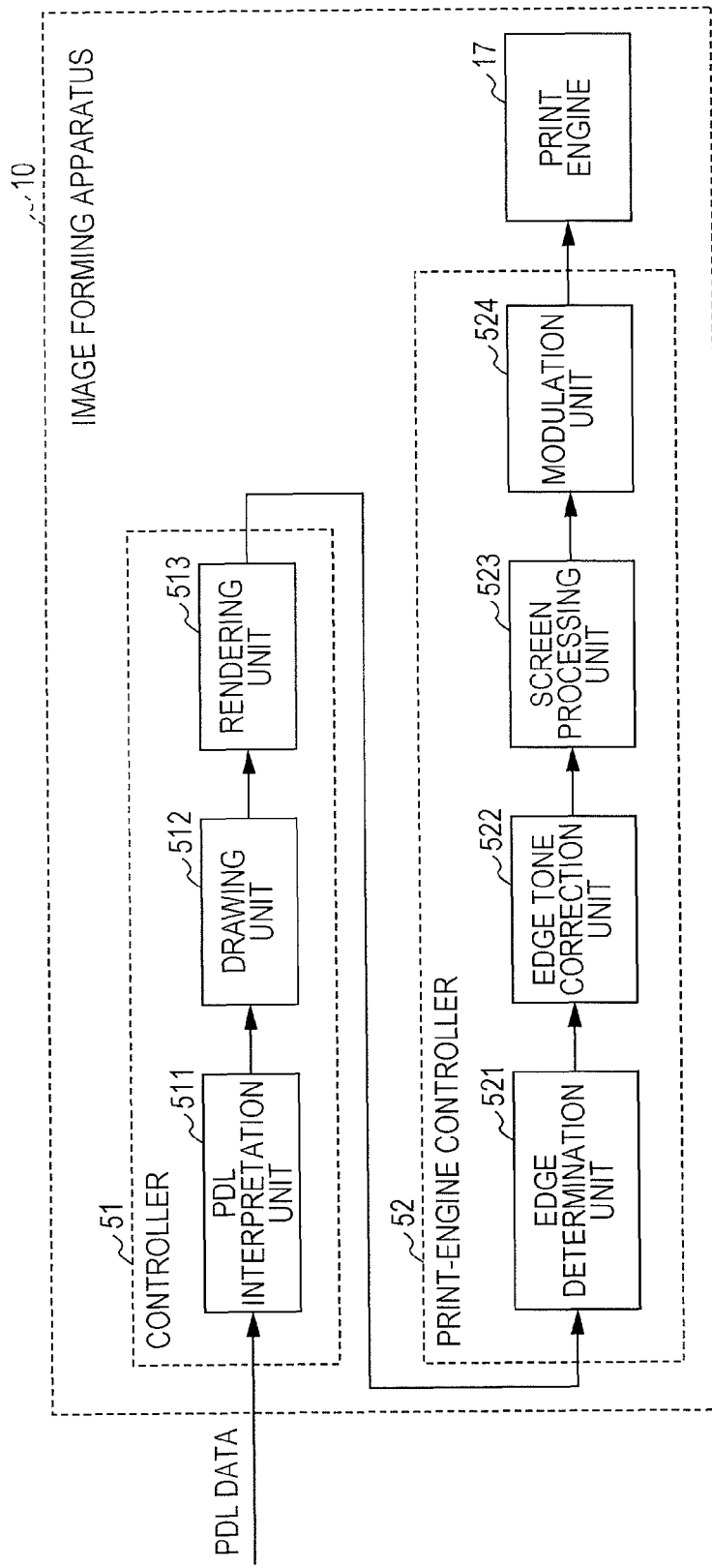
FIG. 6 is a block diagram illustrating a functional configuration of the image forming apparatus according to the exemplary embodiment of the present invention.

FIG. 6 is a block diagram illustrating a functional configuration of the image forming apparatus 10 that is realized by executing the above-mentioned control program.

As illustrated in FIG. 6, the image forming apparatus 10 according to the present exemplary embodiment includes a controller 51, a print-engine controller 52, and a print engine 17.

Furthermore, the controller 51 includes a PDL interpretation unit 511, a drawing unit 512, and a rendering unit 513.

Additionally, the print-engine controller 52 includes an edge determination unit 521, an edge tone correction unit 522, a screen processing unit 523, and a modulation unit 524. Note that an image processing apparatus is constituted by the edge determination unit 521, the edge tone correction unit 522, and the screen processing unit 523.

The PDL interpretation unit 511 receives PDL data from the terminal apparatus 20, and interprets drawing objects that are described using the PDL data.

The drawing unit 512 performs a drawing process for each of the drawing objects that have been interpreted by the PDL interpretation unit 511, thereby performing a process of, for example, generating intermediate code, or converting a color signal (RGB) that is specified in the PDL data into a color signal (YMCK) that is to be used by the print engine 17.

The rendering unit 513 performs a rendering process of generating bitmap data, which is capable of being printed by the print engine 17, for each color, i.e., each of yellow (Y), magenta (M), cyan (C), and black (K), on the basis of the intermediate code, which has been generated by the drawing unit 512.

The edge determination unit 521 performs an edge-portion detection process of detecting an edge portion from the bitmap data (image data) which has been generated by the controller 51, and an edge-width detection process of detecting, for a pixel of the detected edge portion, an edge width that is a width of the edge portion.

In other words, the edge determination unit 521 determines whether or not each of pixels constituting the image data that has been input is a pixel that is included in the edge portion, thereby detecting a pixel of the edge portion. Furthermore, the edge determination unit 521 detects, for the detected pixel of the edge portion, an edge width that is a width of the edge portion.

More specifically, the edge determination unit 521 sequentially selects, as a target pixel, each of the pixels constituting the image data that has been input from the controller 51, and detects, as an edge width, the number of pixels that have pixel values which are almost the same as the pixel value of the target pixel and that are arranged successively from the target pixel in the horizontal direction or the vertical direction.

Note that the details of the edge-portion detection process and the edge-width detection process which are performed by the edge determination unit 521 will be described below.

A result of the edge-portion detection process and a result of the edge-width detection process, which are performed by the edge determination unit 521, are transferred to the edge tone correction unit 522 and the screen processing unit 523.

When the edge width that has been detected using the edge-width detection process performed by the edge determination unit 521 is smaller than a value that is set in advance, the edge tone correction unit 522 performs tone correction differently in accordance with the detected edge width. In the present exemplary embodiment, the edge tone correction unit 522 performs, for an edge portion (a fine line) having an edge width of four dots or less, tone correction differently in accordance with each edge width.

The edge tone correction unit 522 performs tone correction so that a density value of a pixel for which it is determined that the edge width is small is larger than a density value of a pixel for which it is determined that the edge width is large.

In order to realize such a process, the edge tone correction unit 522 has four LUTs (conversion tables) that correspond to edge widths. The edge tone correction unit 522 switches the LUT that is to be used among the four LUTs in accordance with the edge width detected by the edge determination unit 521, and performs tone correction.

The screen processing unit 523 performs screen processing for the bitmap data that has been subjected to tone correction by the edge tone correction unit 522, thereby generating a pseudo halftone image.

The screen processing unit 523 performs screen processing on a pixel-by-pixel basis as follows: the screen processing unit 523 performs screen processing with a screen ruling of 600 lines (a high screen ruling) for pixels of an edge portion having a detected edge width of four dots or less; and the screen processing unit 523 performs screen processing with a screen ruling of 200 lines (a low screen ruling) for pixels of a non-edge portion and for pixels of an edge portion having an edge width of five dots or more.

The modulation unit 524 performs a modulation process on the basis of the image data that has been subjected to screen processing by the screen processing unit 523, thereby generating a pulse signal that is to be used to print the image data.

The print engine 17 performs control of laser in accordance with the pulse signal, which has been generated by the modulation unit 524, thereby outputting, onto a sheet of printing paper, an image based on the image data that has been subjected to tone correction by the edge tone correction unit 522.

Note that, although the edge-portion detection process and the edge-width detection process, and screen processing are performed by the print-engine controller 52 in the present exemplary embodiment, the edge-portion detection process and the edge-width detection process, and screen processing may be performed by the rendering unit 513 in order to perform load distribution.

Next, the operation of the image forming apparatus 10 according to the present exemplary embodiment will be described in detail with reference to the drawings.

First, the details of the edge-portion detection process performed by the edge determination unit 521 illustrated in FIG. 6 will be described with reference to FIG. 7.

Figure 7:
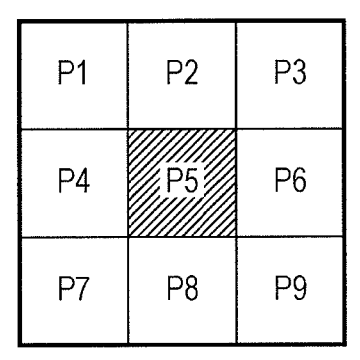

The edge-portion detection process illustrated in FIG. 7 is a detection process using a density-difference determination method that uses an edge detection window of three columns×three rows. In this density-difference determination method, a pixel P5 is set as the target pixel, and whether the target pixel P5 is a pixel of an edge portion or a pixel of a non-edge portion is determined on the basis of pixel values of eight pixels P1 to P4 and P6 to P9 surrounding the target pixel P5.

More specifically, in a case in which the pixel values of the eight pixels P1 to P4 and P6 to P9, are denoted by P1 to P4 and P6 to P9, respectively, values SH, SV, SR, SL are calculated using Equations (1) to (4) described below.

$$SH = |(P1 + P2 + P3) - (P7 + P8 + P9)| \quad (1)$$

$$SV = |(P1 + P4 + P7) - (P3 + P6 + P9)| \quad (2)$$

$$SR = |(P1 + P2 + P4) - (P6 + P8 + P9)| \quad (3)$$

$$SL = |(P4 + P7 + P8) - (P2 + P3 + P6)| \quad (4)$$

When a maximum value (Max (SH, SV, SR, SL)) among the values is equal to or larger than an edge threshold, it is determined that the target pixel is a pixel of an edge portion. When the maximum value (Max (SH, SV, SR, SL)) is smaller than the edge threshold, it is determined that the target pixel is a pixel of a non-edge portion. Note that, when the pixel value of each of the pixels is represented by one of values 0 to 255, the edge threshold is set to be, for example, a value of 240. Note that, after one pixel is set as the target pixel and a determination process of determining whether the target pixel is a pixel of an edge portion or a pixel of a non-edge portion is performed for the pixel, while the target pixel is being shifted on a one-pixel-by-one-pixel basis, the determination process of determining whether the target pixel is a pixel of an edge portion or a pixel of a non-edge portion is sequentially performed for all of the pixels constituting the image data. However, the determination process may be performed for a specific image region that is necessary for a process instead of for all of the pixels constituting the image data.

Next, the details of the edge-width detection process performed by the edge determination unit 521 illustrated in FIG. 6 will be described with reference to FIGS. 8, 9A to 9C, and 10.

In the edge-width detection process, a determination window of nine columns×nine rows illustrated in FIG. 8 is used. The reason why the determination window of nine columns× nine rows is used is that detection of a fine line (a positive fine line) having an edge width of four dots or less is performed. In a case of detection of a positive fine line having an edge width of three dots or less, a determination window of seven columns×seven rows may be used, as is clear from the number of pixel positions used for determination processes illustrated in FIG. 9C. Similarly, in a case of detection of a positive fine line having an edge width of two dots or less, a determination window of five columns×five rows may be used, and, in a case of detection of a positive fine line having an edge width of only one dot, a determination window of three columns×three rows may be used. Note that, an edge width of two dots or less is detected when a printing process with 600 dots per inch (dpi) is to be performed or an edge width of four dots or less is detected when a printing process with 1200 dpi is to be performed, and tone correction is performed differently in accordance with the detected edge width. In this manner, a visually perceptible faint portion of a fine line becomes almost not noticeable. In other words, an edge width that is equal to or smaller than a width corresponding to one pixel in a case of 300 dpi may be detected.

Here, the term "positive fine line" refers to, among lines constituted by pixels having density values that are higher than the density value of a background, a line having a line width that is equal to or smaller than the number of pixels (the number of dots) which is set in advance. Note that, in the present exemplary embodiment, a positive line having a line width of four dots or less is represented as a positive fine line.

The edge determination unit 521 sets, as the target pixel, a forty-first pixel in the determination window of nine columns×nine rows illustrated in FIG. 8. When determination conditions illustrated in FIGS. 9A to 9C and 10 are satisfied, the edge determination unit 521 determines that the target pixel is a pixel that is included in a positive fine line.

FIG. 9A is a table illustrating conditions for determining a one-dot positive fine line. FIG. 9B is a table illustrating conditions for determining a two-dot positive fine line. FIG. 9C is a table illustrating conditions for determining a three-dot positive fine line. Furthermore, FIG. 10 is a table illustrating conditions for determining a four-dot positive fine line.

Note that, in FIGS. 9A to 9C and 10, for simplicity of description, for example, the pixel value of the forty-first pixel is simply denoted by "41", and the pixel value of a fortieth pixel is simply denoted by "40".

Moreover, when each of the pixel values is represented by one of values 0 to 255, a background density threshold is set to be, for example, a value of 20, and a dot density threshold is set to be, for example, a value of 100.

For example, as illustrated in FIG. 9B, in a case in which the pixel value of the forty-first pixel that is set as the target pixel and the pixel value of the fortieth pixel are equal to each other (dot determination), in which the pixel value of a thirty-ninth pixel and the pixel value of a forty-second pixel are equal to each other (background determination), in which the pixel value of the thirty-ninth pixel is equal to or smaller than the background density threshold (20) (background density determination), and in which the difference between the pixel value of the forty-first pixel and the pixel value of the thirty-ninth pixel is equal to or larger than the dot density threshold (100) (dot density determination), it is determined that the forty-first pixel which is set as the target pixel is a pixel which is included in a two-dot positive fine line.

Next, a specific flow of determination using the determination conditions illustrated in FIGS. 9A to 9C and 10 will be descried. First, a pixel (the forty-first pixel) that is located at the center of the determination window of nine columns×nine rows is set as the target pixel. Horizontal detection and vertical detection, which are illustrated in FIG. 9A, for determining a one-dot positive fine line are performed. After that, horizontal detection and vertical detection illustrated in FIGS. 9B, 9C, and 10 are sequentially performed. Then, when some of the determination conditions are satisfied, it is determined that the target pixel is included in a positive fine line having a fine-line width for which the determination conditions are set. When none of the determination conditions are satisfied, it is determined that the target pixel is not included in a fine line. Note that, as described above, all of the determination processes illustrated in FIGS. 9A to 9C and 10 may be performed for the pixel that is a process target. Alternatively, at a point in time when some of the determination conditions are satisfied, it may be determined that the target pixel is included in a positive fine line having a fine-line width for which the determination conditions are set, and the determination processes thereafter may be omitted. In the latter case, an increase in processing speed becomes possible.

Then, the above-described determination processes have been completed for the target pixel (herein, the forty-first pixel), the determination window of nine columns×nine rows is shifted so that the target pixel which is the next process target is located at the center of the determination window, and determination processes similar to the above-described determination processes are performed. The above-described processes are performed sequentially for pixels that have been determined to be pixels of an edge portion.

Note that, regarding the order in which the edge-portion detection process of detecting a pixel of an edge portion and the edge-width detection process of detecting an edge width are performed, any order may be used as the order because it is only necessary to distinguish pixels that belong to a fine line having a fine-line width (four dots or less in the present exemplary embodiment) which is set in advance, the other pixels of an edge portion, and pixels of a non-edge portion from one another. For example, first, the edge-portion detection process may be performed for all pixels that are process targets, and, after that, the edge-width detection process may be performed for, among the pixels that are process targets, pixels that have been determined to be pixels of an edge portion. Alternatively, both the edge-portion detection process and the edge-width detection process may be performed for one pixel as a pixel that is a process target, and the pixel that is a process target may be sequentially shifted. Additionally, regarding the edge-width detection process, it is only necessary to detect an edge width as a result for a pixel of an edge portion, and the edge-width detection process may be performed independently of the determination process of determining whether or not the target pixel is a pixel of an edge portion. For example, the edge-width detection process may be performed for all pixels. Alternatively, the determination process of determining whether or not the target pixel is a pixel of an edge portion is not performed at all, and only the edge-width detection process may be performed for pixels that are process targets.

The edge tone correction unit 522 performs edge tone correction using settings, for example, illustrated in FIG. 11, on the basis of results of the edge-portion detection process and the edge-width detection process that have been performed by the edge determination unit 521. Furthermore, the screen processing unit 523 performs screen processing using settings, for example, illustrated in FIG. 11, on the basis of the results of the edge-portion detection process and the edge-width detection process that have been performed by the edge determination unit 521.

More specifically, in a case in which the result of the edge-portion detection process is an edge portion and the result of the edge-width detection process is a two-dot positive fine line, i.e., in a case in which it is determined that the target pixel is a pixel included in a two-dot positive fine line, the edge tone correction unit 522 performs tone correction using an LUT2 for the pixel. Then, the screen processing unit 523 performs screen processing with a screen ruling of 600 lines for the pixel.

Note that four conversion tables which are called LUT1 to LUT4 are set in advance in the edge tone correction unit 522. Here, the individual LUT1 to LUT4 are set so as to be used to perform conversion in which the differences in the tone characteristics that are illustrated in FIG. 2 and that depend on the edge widths (the line widths of the fine lines) are corrected so that the tone characteristics are the same. More specifically, even when pixel values are the same in the image data that has been input, regarding a pixel that belongs to a finer line, the pixel value (the density value) of the pixel in a case of providing a specification for the print engine is set to be higher, thereby correcting the differences.

Modification Example

The exemplary embodiment given above is described using a case of detecting a fine line having a line width of four dots or less (a fine line having a line width of one dot to four dots) as a positive fine line. However, the present invention is not limited to the case. Also in a case of detecting a positive fine line having a line width that is larger than four dots and a case of detecting only a fine line having a line width of three dots or less as a positive fine line, the present invention may be similarly applied.

Furthermore, in the above-described exemplary embodiment, switching among the conversion tables (the LUT1 to LUT4) for performing tone correction in accordance with a detected edge width is performed. However, conversion tables may be prepared on the basis of combinations of detected edge widths and screen rulings in screen processing, and a conversion table that is to be used may be switched among the conversion tables in accordance with a detected edge width and screen processing. Moreover, one common LUT for edge widths which are equal to or smaller than a line width that is set in advance may be prepared (for example, one LUT may be prepared for fine lines having edge widths of one dot, two dots, three dots, and four dots), and, when an edge width is equal to or smaller than the line width that is set in advance, the common LUT may be used.

Note that, in the exemplary embodiment and the modification example which are described above, it is only necessary to set a line width that is to be determined before the determination processes are performed. For example, a manufacturer of an apparatus may set, in advance, the line width that is to be determined. Alternatively, before a printing process is performed, a user may set, in advance, via a user interface, the line width that is to be determined.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image processing apparatus comprising:
   an edge-portion detector that detects a pixel of an edge portion by determining whether or not each of pixels constituting image data which has been input is a pixel which is included in the edge portion;
   an edge-width detector that detects an edge width of the edge portion by detecting a number of continuous pixels of the edge portion arranged in a horizontal or vertical direction, the continuous pixels having the same value as one another; and
   a density correction unit that increases, in response to the edge-width detector detecting that the number of continuous pixels of a first edge portion is smaller than a value which is set in advance, a density of continuous pixels of the first edge portion without changing an edge width of the first edge portion so that the density of continuous pixels of the first edge portion is higher than a density of continuous pixels of a second edge portion, wherein the number of continuous pixels of the second edge portion is larger than the value which is set in advance.

2. The image processing apparatus according to claim 1, wherein the density correction unit has a plurality of conversion tables, correspondence relationship between input data and output data of each conversion table being different from that of other conversion tables, and increases the density of continuous pixels of the first edge portion by switching a conversion table to increase a value of the output data for the continuous pixels of the first edge portion so that the density of continuous pixels of the first edge portion is higher than the density of continuous pixels of the second edge portion.

3. The image processing apparatus according to claim 2, wherein the edge-width detector sequentially selects, as a target pixel, each of the pixels constituting the image data, and detects, as the edge width, the number of pixels that have pixel values which are almost the same as a pixel value of the target pixel and that are arranged successively from the target pixel in the horizontal direction or the vertical direction.

4. The image processing apparatus according to claim 1, wherein the edge-width detector sequentially selects, as a target pixel, each of the pixels constituting the image data, and detects, as the edge width, the number of pixels that have pixel values which are almost the same as a pixel value of the target pixel and that are arranged successively from the target pixel in the horizontal direction or the vertical direction.

5. The image processing apparatus according to claim 1, wherein for each single color of the image processing apparatus, the edge-portion detector detects a pixel of the edge portion, the edge-width detector detects an edge width of the edge portion, and the density correction unit performs a density correction.

6. An image forming apparatus comprising:
   an edge-portion detector that detects a pixel of an edge portion by determining whether or not each of pixels constituting image data which has been input is a pixel which is included in the edge portion;
   an edge-width detector that detects an edge width of the edge portion by detecting the number of continuous pixels of the edge portion arranged in a horizontal or vertical direction, the continuous pixels having the same value as one another;
   a density correction unit that increases, in response to the edge-width detector detecting that the number of continuous pixels of a first edge portion is smaller than a value which is set in advance, a density of continuous pixels of the first edge portion without changing an edge width of the first edge portion so that the density of continuous pixels of the first edge portion is higher than a density of continuous pixels of a second edge portion, and
   an image output unit that outputs an image on the basis of the image data which has been subjected to density correction by the density correction unit,
   wherein the number of continuous pixels of the second edge portion is larger than the value which is set in advance.

7. An image processing method comprising:
   detecting a pixel of an edge portion by determining whether or not each of pixels constituting image data which has been input is a pixel which is included in the edge portion;
   detecting an edge width of the edge portion by detecting a number of continuous pixels of the edge portion arranged in a horizontal or vertical direction, the continuous pixels having the same value as one another; and
   increasing, in response to detecting that the number of continuous pixels of a first edge portion is smaller than a value which is set in advance, a density of continuous pixels of the first edge portion without changing an edge width of the first edge portion so that the density of continuous pixels of the first edge portion is higher than a density of continuous pixels of a second edge portion, wherein the number of continuous pixels of the second edge portion is larger than the value which is set in advance.

8. A non-transitory computer-readable medium storing a program causing a computer to execute a process, the process comprising:
   detecting a pixel of an edge portion by determining whether or not each of pixels constituting image data which has been input is a pixel which is included in the edge portion;
   detecting an edge width of the edge portion by detecting a number of continuous pixels of the edge portion arranged in a horizontal or vertical direction, the continuous pixels having the same value as one another; and
   increasing, in response to detecting that the number of continuous pixels of a first edge portion is smaller than a value which is set in advance, a density of continuous pixels of the first edge portion without changing an edge width of the first edge portion so that the density of continuous pixels of the first edge portion is higher than a density of continuous pixels of a second edge portion, wherein the number of continuous pixels of the second edge portion is lamer than the value which is set in advance.

* * * * *